(12) United States Patent
Haines

(10) Patent No.: US 10,040,501 B2
(45) Date of Patent: Aug. 7, 2018

(54) RETRACTABLE MOBILITY-SCOOTER CANOPY SYSTEM

(71) Applicant: Elizabeth Haines, Milford Haven (GB)

(72) Inventor: Elizabeth Haines, Milford Haven (GB)

(73) Assignee: Elizabeth Haines, Milford Haven (GB)

( * ) Notice: Subject to any disclaimer, the term of this patent is extended or adjusted under 35 U.S.C. 154(b) by 0 days.

(21) Appl. No.: 15/326,651

(22) PCT Filed: Jun. 29, 2015

(86) PCT No.: PCT/GB2015/051882
§ 371 (c)(1),
(2) Date: Jan. 17, 2017

(87) PCT Pub. No.: WO2016/009169
PCT Pub. Date: Jan. 26, 2016

(65) Prior Publication Data
US 2017/0203804 A1 Jul. 20, 2017

(30) Foreign Application Priority Data
Jul. 18, 2014 (GB) .................................. 1412844.1

(51) Int. Cl.
*B62J 17/08* (2006.01)
*B62K 5/007* (2013.01)

(52) U.S. Cl.
CPC .............. *B62J 17/08* (2013.01); *B62K 5/007* (2013.01)

(58) Field of Classification Search
CPC . B62J 17/04; B62J 17/06; B62J 17/065; B62J 17/08; B62J 17/083; B62J 17/086; B62J 17/02; B62J 17/00
See application file for complete search history.

(56) References Cited

U.S. PATENT DOCUMENTS

| | | | | |
|---|---|---|---|---|
| 4,098,536 A | * | 7/1978 | Mills | ........................ B60J 11/00 |
| | | | | 135/117 |
| 4,336,964 A | * | 6/1982 | Pivar | ...................... B60J 5/0487 |
| | | | | 180/210 |

(Continued)

FOREIGN PATENT DOCUMENTS

| | | |
|---|---|---|
| DE | 102005021872 | 10/2006 |
| EP | 1707479 A2 * 10/2006 | ............ B62J 17/065 |

(Continued)

OTHER PUBLICATIONS

International Search Report dated Nov. 4, 2015 for PCT/GB2015/051882.
British Search Report dated Dec. 15, 2014 for GB1412844.1.

*Primary Examiner* — Jacob B Meyer
(74) *Attorney, Agent, or Firm* — A. C. Entis-IP Ltd.

(57) ABSTRACT

A retractable mobility-scooter canopy system (12) comprising a plurality of support elements (38, 40), at least a majority of the support elements (40) being movable relative to each other, and a pliantly-flexible cover element (42) extending between each said movable support element (40). The or each cover element (42) is at least in part light transmissible. An in use lowermost support element (52*a*) having a contoured longitudinal extent defining a wind-occlusion portion (52*b*) which in use complementarily or substantially complementarily matches a step-through portion (20) of a chassis (14) of a mobility scooter (10) to which the canopy system is attached, thereby occluding wind ingress and preventing or limiting a lateral tipping hazard.

11 Claims, 3 Drawing Sheets

(56) References Cited

U.S. PATENT DOCUMENTS

| | | | | |
|---|---|---|---|---|
| 4,440,436 A * | 4/1984 | Giddens | B60J 7/1278 | 135/141 |
| 4,621,859 A * | 11/1986 | Spicher | B60J 5/0487 | 296/77.1 |
| 4,632,448 A * | 12/1986 | Yagasaki | B60J 7/08 | 296/102 |
| D291,878 S * | 9/1987 | Cook | D12/16 | |
| 4,773,694 A * | 9/1988 | Gerber | B60J 7/104 | 296/77.1 |
| 5,052,738 A * | 10/1991 | Li | A41D 3/08 | 150/166 |
| 5,072,987 A * | 12/1991 | Allen | B62J 17/08 | 296/107.09 |
| 5,174,622 A * | 12/1992 | Gutta | B60J 5/0487 | 180/210 |
| D332,437 S * | 1/1993 | Lay, Jr. | D12/405 | |
| 5,203,601 A * | 4/1993 | Guillot | B60J 5/0487 | 296/102 |
| D355,403 S * | 2/1995 | Eberle | D12/402 | |
| 5,388,881 A * | 2/1995 | Spencer | B60J 7/104 | 296/77.1 |
| 5,393,118 A * | 2/1995 | Welborn | B60J 5/0487 | 280/DIG. 5 |
| 5,458,390 A * | 10/1995 | Gilbert | B62J 17/00 | 296/102 |
| 5,509,717 A * | 4/1996 | Martin | B60J 7/104 | 280/756 |
| 5,662,372 A * | 9/1997 | Lubkeman | A41D 3/08 | 150/166 |
| 5,685,388 A * | 11/1997 | Bothwell | B62H 1/06 | 180/219 |
| 5,791,718 A * | 8/1998 | Boutin | B62J 17/00 | 296/136.01 |
| 6,279,986 B1 * | 8/2001 | Hinsperger | B62D 33/0621 | 296/102 |
| 6,402,220 B2 * | 6/2002 | Allen | B60J 11/00 | 135/124 |
| 6,543,830 B1 * | 4/2003 | Stuck | B60J 5/0487 | 296/77.1 |
| 6,565,139 B2 * | 5/2003 | Bayerle | B60J 11/00 | 135/127 |
| 6,926,334 B1 * | 8/2005 | Diehm | B60J 1/00 | 160/328 |
| 7,013,904 B2 * | 3/2006 | Kofler | E04H 6/005 | 135/132 |
| 7,354,092 B2 * | 4/2008 | Showalter | B62D 33/0621 | 296/77.1 |
| 7,854,463 B1 * | 12/2010 | Neumann | B62D 33/0621 | 296/144 |
| 8,360,084 B1 * | 1/2013 | Robinson | E04H 6/005 | 135/133 |
| 8,532,915 B2 * | 9/2013 | Kim | B62D 37/06 | 180/252 |
| 8,882,170 B2 * | 11/2014 | Brown, Jr. | B60J 5/0487 | 296/79 |
| D723,451 S * | 3/2015 | Depew, Jr. | D12/402 | |
| D740,174 S * | 10/2015 | Brown, Jr. | D12/16 | |
| 9,387,746 B2 * | 7/2016 | Rutland | B60J 11/06 | |
| 9,688,336 B2 * | 6/2017 | Lafleur | B62J 17/00 | |
| 9,849,762 B2 * | 12/2017 | Tyrer | B60J 7/10 | |
| 2001/0035666 A1 * | 11/2001 | Allen | B60J 11/00 | 296/102 |
| 2002/0167190 A1 * | 11/2002 | McElwee | B60J 7/102 | 296/77.1 |
| 2006/0102222 A1 * | 5/2006 | Zebley | E04H 6/04 | 135/133 |
| 2006/0290163 A1 * | 12/2006 | Showalter | B62D 33/0621 | 296/77.1 |
| 2011/0231041 A1 * | 9/2011 | Kim | B62D 37/06 | 701/22 |
| 2011/0231060 A1 * | 9/2011 | Kim | B62D 37/06 | 701/41 |
| 2011/0231085 A1 * | 9/2011 | Kim | B62D 37/06 | 701/124 |
| 2015/0137557 A1 * | 5/2015 | Thomas | B62J 17/08 | 296/190.09 |
| 2016/0052582 A1 * | 2/2016 | Louisa | B62J 17/00 | 296/190.03 |
| 2017/0203804 A1 * | 7/2017 | Haines | B62J 17/08 | |

FOREIGN PATENT DOCUMENTS

| | | | | |
|---|---|---|---|---|
| EP | 2559612 A1 * | 2/2013 | | B62J 17/065 |
| EP | 2982584 A1 * | 2/2016 | | B62J 17/065 |
| FR | 2900630 A1 * | 11/2007 | | B62J 17/08 |
| FR | 3025776 A1 * | 3/2016 | | B62J 17/065 |
| GB | 2091185 A * | 7/1982 | | B62J 17/08 |
| GB | 2423058 | 8/2006 | | |
| GB | 2445010 | 6/2008 | | |
| GB | 2521400 A * | 6/2015 | | B62K 5/025 |
| KR | 201268094 | 6/2012 | | |
| KR | 200474244 | 9/2014 | | |
| WO | 20131235373 | 8/2013 | | |

* cited by examiner

RETRACTABLE MOBILITY-SCOOTER CANOPY SYSTEM

CROSS-REFERENCE TO RELATED APPLICATIONS

The present application is a U.S. National Phase of PCT Application No. PCT/GB2015/051882, filed on Jun. 29, 2015, which claims the benefit under 35 U.S.C. § 119(a)-(d) of British Application GB 1412844.1 filed on Jul. 18, 2014. The contents and disclosures of these prior applications are incorporated herein by reference in their entirety.

FIELD OF THE INVENTION

The present invention relates to a retractable mobility-scooter canopy system incorporating canopy apparatus for a personal mobility vehicle, in particular for a mobility scooter, which is capable of being retracted whilst the personal mobility vehicle is in use and which, during inclement weather, will prevent or limit the possibility of tipping over. The invention further relates to a personal mobility vehicle having such a canopy system, and methods of preventing or limiting tilting or tipping of a mobility scooter due to crosswind and preventing or limiting wind ingress into a retractable canopy of a mobility scooter, preferably using said system.

BACKGROUND OF THE INVENTION

Personal mobility vehicles, such as mobility scooters, are typically provided open-topped, without any means of protecting the user or occupant from inclement weather conditions. Whilst it is possible to purchase covers which offer some elemental protection, these covers are typically cumbersome, needing to be attached or removed from the vehicle prior to or after a journey. Many such covers substantially enclose the vehicle, which can resultantly become stuffy or humid in warm weather.

Such encompassing covers also make it more complicated to enter and exit the personal mobility vehicle, utilising zip-sealable door panels, which can be difficult or fiddly for the elderly or infirm to open easily.

Some such covers make use of a smaller covering for only a portion of the personal mobility vehicle, generally positioned over the head of the seated user, consisting of top and rear portions, or maybe a smaller sidewall, offering some protection from rain, but little protection from the wind. An additional problem with such covers is that the wind can catch and blow the cover off or open.

Strong winds are a considerable issue for mobility scooters, especially those fitted with a canopy which can catch the force of the wind. Where the canopy extends to substantially surround the mobility scooter, large flat areas can act as sails and cause undesired movement of the scooter, including tipping or rolling in severe cases. The wind is also able enter beneath the roof portion of the canopy, typically at the step-through area of the chassis, again causing undesired and dangerous motion, lifting and tipping.

BRIEF SUMMARY OF THE INVENTION

The present invention seeks to overcome the above-mentioned problems.

According to a first aspect of the invention, there is provided a retractable mobility-scooter canopy system comprising a plurality of support elements, at least a majority of the support elements being movable relative to each other, and a pliantly-flexible cover element extending between each said movable support element, each said cover element being at least in part light transmissible, an in use lowermost support element having a contoured longitudinal extent defining a wind-occlusion portion which in use complementarily or substantially complementarily matches a step-through portion of the chassis of the mobility scooter thereby occluding wind ingress.

The problem with present cover systems for personal mobility vehicles is that they are either insufficiently protective, leaving the user at least partially exposed to inclement weather, or are cumbersome, making it difficult and/or slow to engage the cover, and subsequently difficult to enter and exit the vehicle. Furthermore, wind is able to ingress, causing a tipping hazard.

The present invention solves this issue by providing a canopy shell which can fully encapsulate a user, in particular at the sides of the vehicle, whilst being simple to engage and disengage between the extended and retracted states. This simplicity is attractive to the users of such personal mobility vehicles, who are typically either elderly or infirm, and may have limited mobility, agility or strength, having difficulty with existing covers.

Preferably, the in use wind-occlusion portion matches or substantially matches a chassis curvature of a mobility scooter to accommodate front and rear wheel arches and the step-through portion therebetween.

Advantageously, the present invention provides for the option of the retractable canopy shell which is capable of reaching to the lower portions of the chassis of the vehicle, ensuring that gusts of wind or rain do not enter underneath the canopy.

Preferably, the support elements and pliantly-flexible cover elements may define a substantially curved or aerodynamic shape, for added protection from tipping or rolling due to crosswinds.

One issue with existing canopies or covers for personal mobility vehicles is that they can funnel or trap wind, so as to create an uplift or similar force on the vehicle. This can lead to tipping or shaking of the vehicle, which may cause it damage, or injure the occupant. By providing a substantially aerodynamic or otherwise curved canopy shell, along with a lowermost edge of the canopy meeting and conforming or substantially conforming to a front-to-back profile of the chassis, this issue can be substantially obviated.

It will be appreciated that in order to fully protect an occupant of a personal mobility vehicle from inclement weather as well as the ingress of wind, that the sides should be covered. This problem has previously been solved by the use of cumbersome box-like enclosures for the vehicle, which are difficult to enter or exit.

Preferably, the support elements may move relative to each other by way of pivoting about a shared axis.

The simplest mechanism by which the support elements can be actuated relative to one another is by providing a hinged relationship between the two, allowing the moveable elements to move away from a fixed element, with the resultant framework providing the structural support to each cover element to form a canopy shell.

In a preferable arrangement, the shared axis may be defined by two pivot points.

Additionally, the two said pivot points may be formed as part of a horizontal frame element.

Beneficially, adjustment of the horizontal frame element may allow movement of the pivot points along the said shared axis.

Preferably, the support elements move relative to one another by way of telescopic extension.

As an alternative to the pivotable arrangement, it may be alternatively possible to utilise a telescopic means of actuating the moveable frame relative to the support frame. This may prove to be simpler from a manufacturing perspective, or may be more easily operated by the user.

Preferably, the system may comprise one or more mounting means, for affixing the canopy system to the chassis or body of the mobility scooter. This may preferably be formed as one or more releasable fixtures, such as sprung-release button locks.

The canopy system can advantageously either be provided integrally formed with the vehicle, and therefore sold with the vehicle at the point of distribution, or could be created as an attachment, an optional extra which can be readily removed for ease of storage.

Preferably, the support frame may be formed from a durable rigid material and is substantially arcuate along its longitudinal extent, acting as a roll-bar in the event of tipping or rolling of the personal mobility vehicle.

A rigid and durable support frame can have added safety benefits; personal mobility vehicles have been known to topple and injure the occupants in high winds, so the provision of a roll bar would beneficially minimize the risk of damage to the user in any such event.

Preferably, the system may further comprise engagement means for retaining the canopy system in an open, closed, or partially extended, position.

In the event of high winds, it may be highly advantageous to provide a canopy which cannot be blown between the extended or retracted configurations to accidentally cover or expose the user. This can be achieved by the provision of one or more retention or engagement means which hold the moveable frame in position when in any of the open, closed, or partially extended, positions.

Preferably, the system may further comprise one or more connection means on one or more of the support elements for attachment of a storage container into which the user may store possessions.

By providing a storage container, the user can store their possessions easily within the personal mobility vehicle without exposing the possessions to inclement weather. This may be especially applicable to shoppers using such vehicles, who may ordinarily place their goods in a front-mounted basket which could easily get wet.

An alternative and advantageous means of protecting such a basket could also be provided, such as a cover for the basket, which may perform much the same function as the canopy shell for the user.

Preferably, the support elements may include at least a support frame, a moveable frame and a plurality of secondary frame elements, the moveable frame and secondary frame elements being the moveable support elements.

To provide the necessary structural integrity to the canopy shell, it may be advantageous to provide one or more secondary frame elements, such as shell frame elements which support the cover element more fully. To maintain the retractability of the canopy shell, it may therefore be beneficial to also permit said shell frame elements to actuate with the moveable frame, thereby creating a concertina effect to collapse the cover element in the retracted state.

A rear frame element can also assist in creating a rear covering for the canopy shell, which ensures that the user is protected from the elements from all directions. Shaped frame elements may also be provided, in order to provide the necessary shape for the canopy shell to form the wind-occlusion portion of the canopy system.

It is simplest from a manufacturing perspective to provide a manually retractable canopy for the system. However, it may alternatively be beneficial, in particular for individuals with limited upper-body strength or mobility, to provide a mechanically actuated canopy system, utilising actuators to effect the movement of the moveable frame.

A personal mobility vehicle using a canopy system according to the first aspect of the invention will advantageously protect the user of the vehicle whilst being simple to engage and disengage, facilitating access to the user seat.

The support frame of the canopy system may be mounted substantially adjacent the user seat, the support frame extending over the top of the seat in an arcuate fashion.

Mounting the support frame thusly ensures that the user is effectively covered, whilst also provided the secondary advantage of protecting the user should the vehicle become tipped.

The simplest means of retaining the canopy shell in position when in its extended condition is to provide an engagement means capable of engaging with the steering column. This advantageously ensures that the user is fully shielded within the canopy shell, and also protects the steering column, and more particularly the mechanism and electronics housed therewith, from dampness and rain.

According to a second aspect of the invention, there is provided a method of preventing or limiting tilting or tipping of a mobility scooter due to crosswind, preferably utilising a system in accordance with the first aspect of the invention, the method comprising the step of a lowermost edge of a retractable canopy being contoured to follow a chassis profile of at least a step-through between front and rear wheels, whereby wind is prevented or limited from passing beneath the in use lowermost edge of the retractable canopy.

According to a third aspect of the invention, there is provided a method of preventing or limiting wind ingress into a retractable canopy of a mobility scooter, preferably utilising a system in accordance with the first aspect of the invention, the method comprising the step of a lowermost edge of a retractable canopy being contoured to follow a chassis profile of at least a step-through between front and rear wheels, whereby wind is prevented or limited from passing beneath the in use lowermost edge of the retractable canopy.

Preferably, the lowermost edge follows a chassis profile from or adjacent to the or each front wheel, across the step-through and to or adjacent to the or each rear wheel. Furthermore, the lowermost edge may follow a chassis profile from or adjacent to the or each front wheel arch, across the step-through and to or adjacent to the or each rear wheel arch.

According to a fourth aspect of the invention, there is provided a mobility scooter comprising a chassis, front and rear wheels rotatably supported by the chassis, a body mounted on the chassis, a user seat supported by the chassis, a step-through interposed between the front and rear wheels, a steering column with a user-operable steering element at one end and a steering mechanism therewithin interconnecting the user-operable steering element and the or each front wheel, and a steering-column cover system which includes a removable primary cover element extending from the user-operable steering element and along at least a majority of a longitudinal extent of the steering column, and an unfurlable secondary cover element partway along the longitudinal extent of the primary cover element for covering at least an access opening of a steering-column mounted container.

According to a fifth aspect of the invention, there is provided a mobility scooter comprising a chassis, front and rear wheels rotatably supported by the chassis, a body mounted on the chassis, a step-through interposed between the front and rear wheels, a steering column with a user-operable steering element at one end and a steering mechanism therewithin interconnecting the user-operable steering element and the or each front wheel, a user seat supported by the chassis and having pivotable arm rests, and a closable container suspended from at least one said arm rest, the container including closure means for automatically closing an access opening of the container when the arm rest is pivoted to an upright condition.

According to a sixth aspect of the invention, there is provided a retractable mobility-scooter canopy system comprising a plurality of support elements, at least a majority of the support elements being pivotally movable relative to each other around a shared axis defined by at least two pivot points, and a pliantly-flexible cover element extending between each said movable support element, each said cover element being at least in part light transmissible, the said at least two pivot points being movable along said shared axis for altering a width of the canopy system.

According to a seventh aspect of the invention, there is provided a retractable mobility-scooter canopy system comprising a plurality of support elements, at least a majority of the support elements being movable relative to each other, and a pliantly-flexible cover element extending between each said movable support element, each said cover element being at least in part light-transmissible, the support elements and cover element defining a retractable canopy shell, the canopy shell having a non-planar lowermost edge for blocking or occluding a step-through of a mobility-scooter chassis.

The invention will now be more particularly described, by way of example only, with reference to the accompanying drawings, in which:

DETAILED DESCRIPTION OF THE INVENTION

Figure 1:
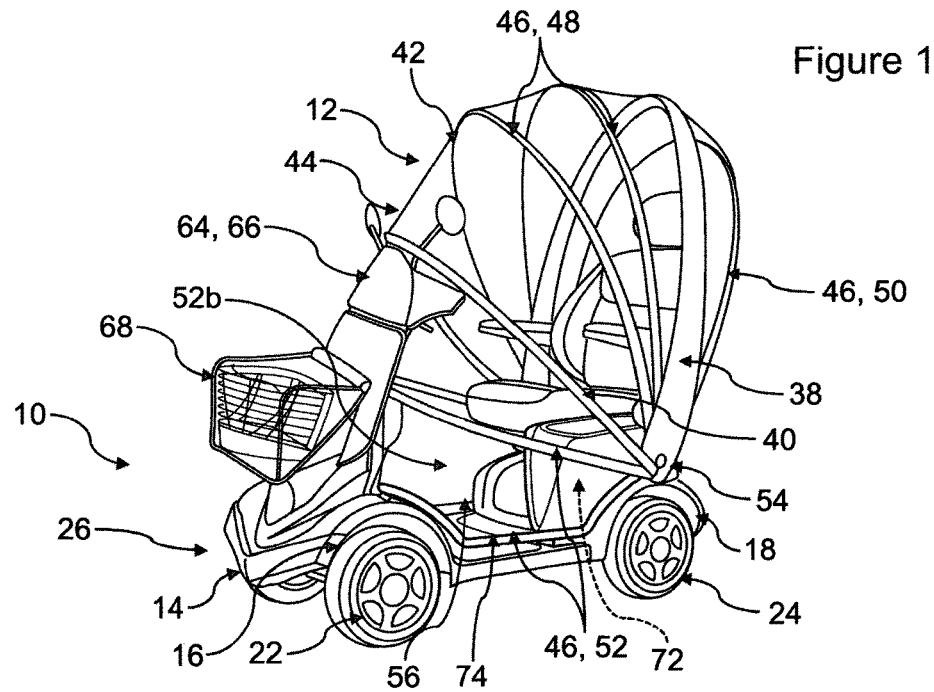
FIG. 1 shows a front perspective view of a personal mobility vehicle having a first embodiment of a retractable mobility-scooter canopy system, in accordance with the invention, the canopy assembly being in its extended configuration.
Figure 2:
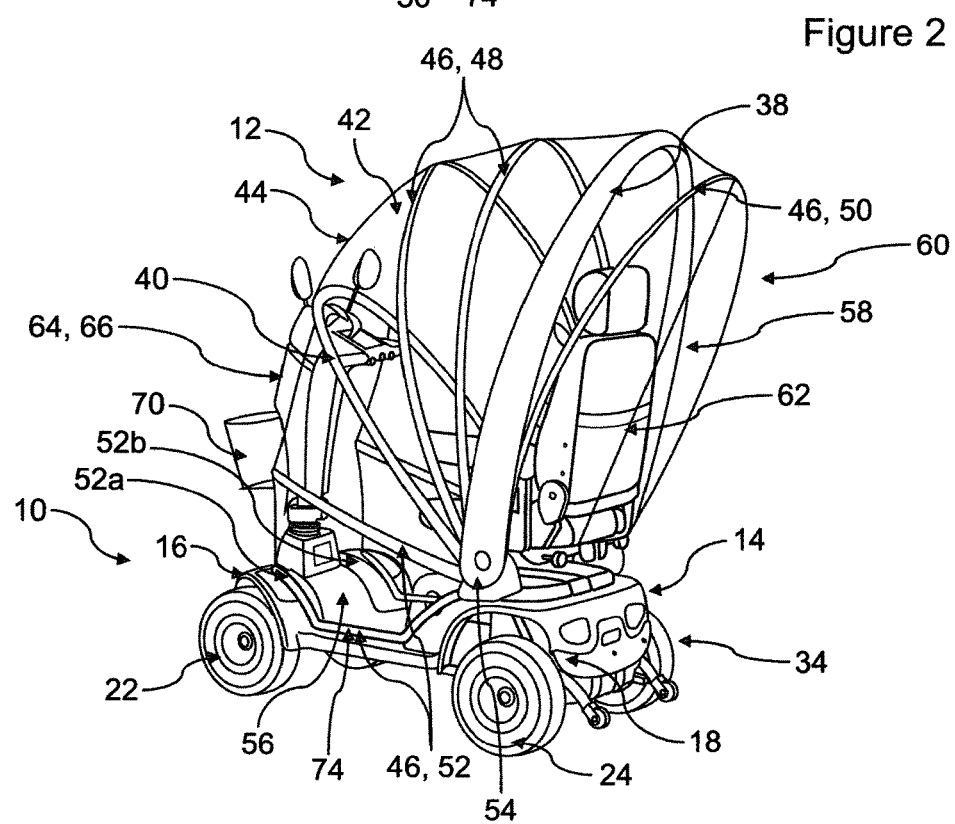
FIG. 2 shows a rear perspective view of the portable mobility vehicle of FIG. 1.
Figure 3:
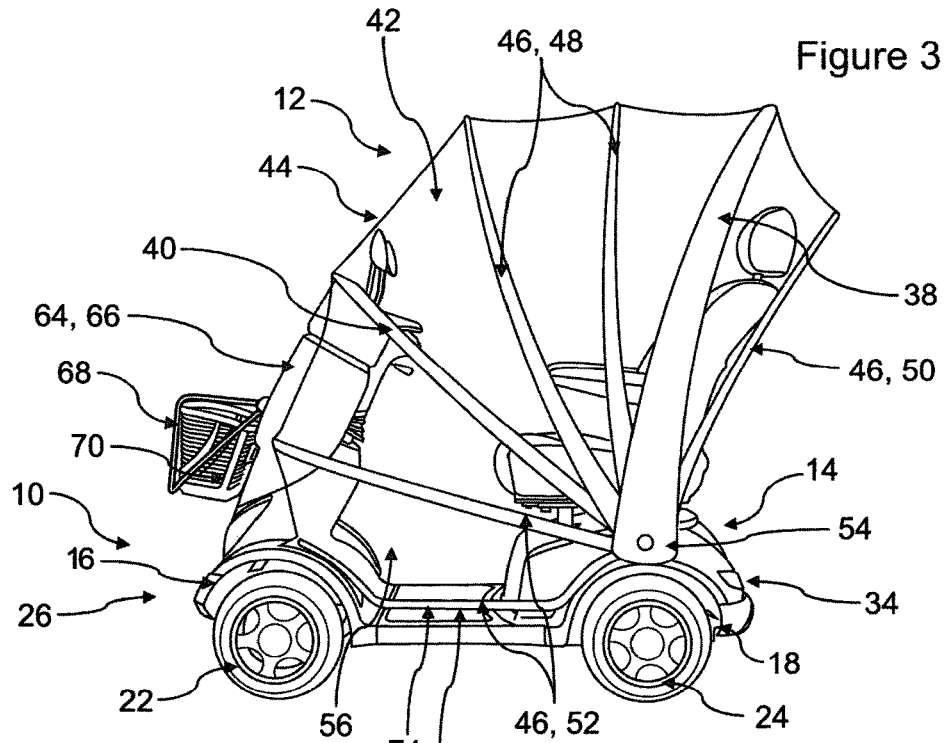
FIG. 3 shows a side view of the portable mobility vehicle of FIG. 1, shown with the canopy in an unfurled condition.
Figure 4:
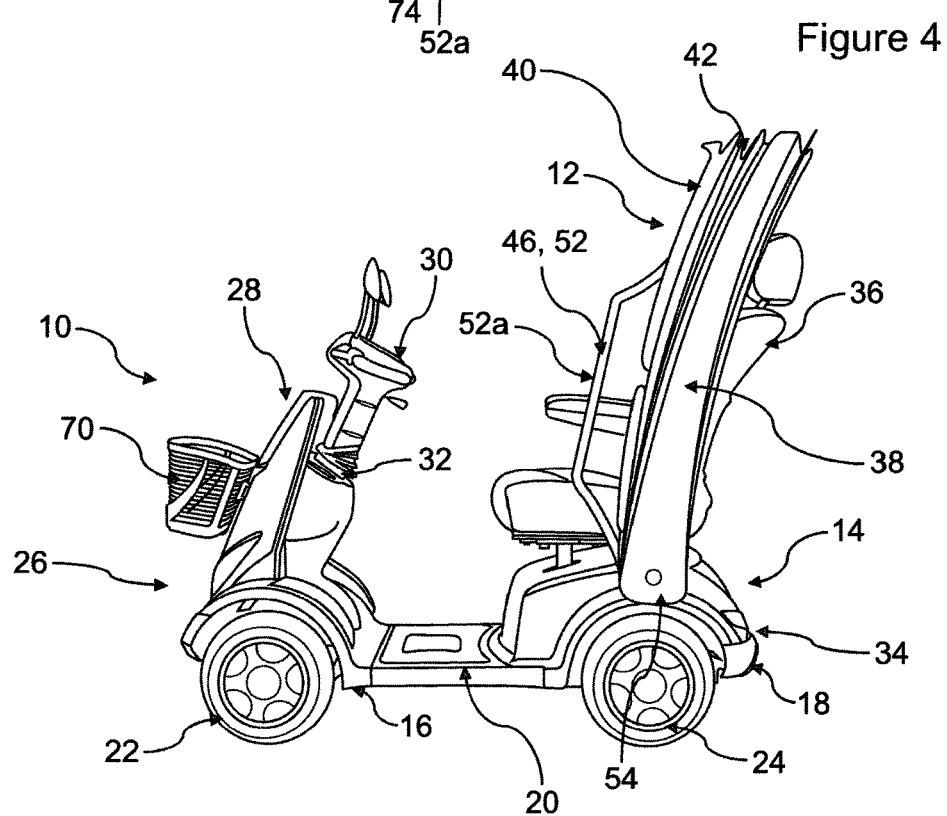
FIG. 4 shows the side view of FIG. 3, with the retractable mobility-scooter canopy system being in a retracted condition.

Referring firstly to FIGS. 1 to 4 of the drawings, there is shown a personal mobility vehicle, indicated globally at 10, in this instance a mobility scooter, which includes a first embodiment of canopy apparatus 12 of a retractable mobility-scooter canopy system in accordance with the present invention.

By way of example, the mobility scooter 10 comprises a wheeled chassis 14 having front and rear wheel arches 16, 18 and a step-through 20 therebetween. A pair of front wheels 22 is mounted at or in the front wheel arches 16, and a pair of rear wheels 24 is mounted at or in the rear wheel arches 18. This is the typical chassis arrangement for a mobility scooter, though variants are known having different numbers of wheels. For example, only one steerable front wheel may be provided centrally at or adjacent to the front of the chassis.

Extending upwardly from or adjacent to the front 26 of the wheeled chassis 14 is a steering column 28 including a user-operable steering element 30, generally comprising handlebars and a velocity control means, but some mobility scooters are operable using a steering wheel arrangement. A steering mechanism 32 is included, connecting the steering element 30 to the front wheels 22 to permit a user to control the direction of the mobility scooter 10.

Affixed to or adjacent to a rear 34 of the wheeled chassis 14 is a user seat 36, in which the user can sit and operate the steering element 30. The user seat 36 is accessible through the step-through 20 of the wheeled chassis 14. Such a mobility scooter is typical of those found in the art.

The canopy apparatus 12 is then affixed to the mobility scooter 10. The canopy apparatus 12 comprises a support frame 38 fixed relative to the mobility scooter 10, a moveable frame 40, moveable relative to the support frame 38, and a pliantly-flexible cover element 42 extending between the support and moveable frames 38, 40.

In the present embodiment, a canopy shell 44 is formed by the combination of the support frame 38, the moveable frame 40 and the cover element 42, with a plurality of secondary frame elements 46 to provide an overall shape to the cover element 42 forming the outermost extent of the canopy shell 44. The term 'shell' is best used to describe the resultant canopy, since the cover element 42 extends to form a shape substantially similar to the shell of a mollusc or armadillo, being substantially curved along an outer extent.

These secondary frame elements 46 comprise a plurality of shell frame elements 48 interposed between the support and moveable frames 38, 40 to provide structure to the cover element 42 directly above the user seat 36 and step-through 20, a rear frame element 50 positioned behind the support element 38 to shape the cover element 42 around the rear of the user seat 36, and a plurality of shaped frame elements 52 which extend forwardly of or below the moveable element 40 and provide shape to the cover element 42 in the vicinity of the wheeled chassis 14. In particular, the lowermost shaped frame element 52a has a contoured longitudinal extent defining a wind-occlusion portion 52b which in use complementarily or substantially complementarily matches the step-through 20, and in this case curvedly extends around at least a portion of the front and rear wheels arches 16, 18.

In combination, the support frame 38, moveable frame 40 and secondary frame elements 46 form a plurality of support elements, a majority of which being moveable relative to one another. In this case, only the support frame 38 is fixed relative to the mobility scooter 10.

The support frame 38 is formed from a rigid, durable material, such as a hard-wearing plastic or metal, and is formed as a sweeping arc passing over the top of the user seat 36, affixed either side of the user seat 36 to the wheeled chassis 14. At or adjacent the points at which the support frame 38 is connected to the chassis 14, there are provided pivot points 54 to which each additional pivotable element is connected. These pivot points 54 may thus define a shared axis, about which the relevant pivotable elements can be moved.

By forming the support frame 38 from such a material, and in such an arcuate manner, the vehicle 10 is therefore formed with an impromptu roll-cage, should it ever be toppled or blown over in strong winds, thereby protecting the user within from harm.

Typically, the pivot points 54 will be formed or incorporated as individual mounting units affixed to the wheeled chassis 14, to which the support frame 38 is attached, the pivot points 54 acting as a vehicle connection means. By way of example, these individual mounting units could be sprung release button locks to enable quick-release of the canopy system. However, it would be equally possible to provide an integrally formed support frame 38 with the wheeled chassis 14. This would be especially useful where the support frame 38 would be expected to act as a roll-cage, as there is minimal risk of dislocation of the support frame 38.

The pivot points 54 could also be included as part of a horizontal frame element spanning laterally between the said pivot points 54. In such a case, the horizontal frame element could itself be mounted directly to the chassis, rather than the pivot points 54. The horizontal frame element could advantageously strengthen the canopy system by providing a buttress between the pivot points and thus the free ends of each of the support elements.

A further advantage could be gained by use of a horizontal frame element, in this example being a bar or strut, which is adjustable. For instance, the length of the horizontal frame element could be adjustable in order that the distance between the pivot points 54 may be varied. Such adjustability may be provided by a telescopic mechanism, or otherwise. This adjustability could allow the pivot points 54 to be positioned more widely than would otherwise be possible due to the restraints of the vehicle chassis, whilst allowing them to be retracted in a lateral direction relative to the chassis in order that the chassis may pass through confined spaces such as doorways. Whilst this retraction and its associated extension may be achieved by way of a length-adjustable horizontal frame element, it could also be achieved by way of adjustably mounted pivot points 54 or other such adjustments or mechanisms.

Adjustment of the pivot points 54, including laterally relative to the chassis or in other required directions, could be electrically operated, for instance by a motor and switch, or could be manual. Manual adjustability may be preferable to reduce weight and thus increase portability, though electrical operation may be desirable where repeated use is likely or where the user perhaps lacks sufficient strength.

The above-mentioned pivotable elements of the canopy shell 44 are the moveable frame 40 and the frame elements 46. Each are similarly formed to the support frame 38 as arcuate elements pivotably connected at the pivot points 54.

The cover element 42 is formed from a pliantly flexible material, such as polyethylene, and is at least in part light-transmissible, preferably being wholly transparent, so as to permit the user to see when the canopy shell 44 is enclosing the user seat 36. The cover element 42 extends substantially from the shaped frame elements 52 at its foremost end, forming together with the lowermost shaped frame element 52a contoured or curving side walls 56 of the canopy shell 44. The cover element 42 then extends over the moveable frame 40 and shell frame elements 48 to the support frame 38, and then past the support frame 38 to the rear frame elements 50. A rear face 58 of the canopy shell 44 is defined by the rear frame element 50, and is covered completely by the cover element 42, thereby providing a back portion 60 to the canopy shell 44.

It will be appreciated that the cover element 42 may be provided as a single sheet covering the entirety of the canopy shell 44, as described above, or may be formed as individual sheets between adjacent pivotable elements. The rear face 58 may also be provided having a zip 62 to open the back portion 60 of the canopy shell 44, thereby permitting ventilation to the user seat 36 during pleasant weather conditions. A draw cord may be provided attached to the zip or other suitable closure device, allowing the user to open and close the back portion 60 whilst seated.

To the front 26 of the wheeled chassis 14, a portion of the cover element 42 is replaced with a steering-column protector 64, which is a waterproof cover 66 preferably affixed to the moveable frame 40 and the cover element 42. This steering-column protector 64 is shaped substantially so as to fit over and engage with the steering column 28 of the mobility scooter 10 along at least a majority of its upstanding longitudinal extent. The protector 64 may be independent or formed as part of the cover element 42. Retainers, such as straps, fasteners or a zip is utilised to retain the protector 64 on the steering column 28 and over and/or around the user-operable steering element 30. The cover 66 has a width which extends over at least a majority of the lateral extent of the steering column 28. As such, the steering column is fully protected from the ingress of water during wet weather, and consequently the mechanical and electrical components housed therein are less prone to water damage, corrosion and failure.

Optionally, an additional cover element 68 may be provided, so as to provide cover for exposed portions of the mobility scooter 10, such as a storage basket 70 on the front 26 of the vehicle 10 or steering column 28. This is beneficial not only to protect the contents in the container 70 from inclement weather, but also to retain those contents therewithin. Typically, the steering column 28 is pivotable fore and aft to simplify ingress and egress of the user, who is typically infirm or disabled. When tilting the steering column 28 forwards, the contents within the basket or container 70 are often prone to falling out. The additional cover element 68, which may be furled and unfurled as required, this covers the access opening of the basket 70, retaining the contents therein.

It will be appreciated that the steering column protector 64 and/or the additional cover element 68 may be utilised independently of each other and/or the canopy shell 44.

Additionally, a storage container 72 may be provided internal to the canopy shell 44, into which a user may store their possessions under the cover provided. This would typically be a compressible bag affixed to the inside of the canopy shell 44 and collapsible with the moveable frame 40. For example, an access opening of the bag 44 may be drawable closed. By providing the access opening on a runner affixed to a pivotable seat arm of the user seat 36, when the seat arm is raised by a user to mount or dismount, the access opening of the bag 44 automatically closes as it niches due to gravity towards the arm hinge.

In use, a user of the mobility scooter 10 enters through the step-through 20. To avoid a collision with the canopy apparatus 12, it must be positioned in a retracted or furled state, such as that shown in FIG. 4. The moveable frame 40 and the shell frame elements 48 are retracted in this condition, such that they are pivoted about the pivot points 54 so as to be substantially adjacent with the support frame 38, the intermediate portions of the cover element 42 being concertinaed so as to allow the canopy shell 44 to be fully retracted away.

In this retracted state, the shaped frame elements 52 are aligned in a substantially upright direction, with the relevant contoured side walls 56 projecting slightly, since a longitudinal edge 74 of the side walls 56 cannot be fully concertinaed due to the contours of the shaped frame elements 52.

Similarly, the rear frame element 50 can be moved so as to lie substantially adjacent the support frame 38, concertinaning the back portion 60 of the cover element 42. Depending upon the orientation of the user seat 36, it may be necessary to unzip or otherwise open up the back portion 60 to allow for the movement of the rear frame element 50 without subsequently damaging the cover element 42.

When in the retracted position, the relevant pivotable elements may be retained in position by some form of clip, or similar retaining means, likely located on the support frame 38. However, it may be more effective to create pivot points 54 which are relative stiff to rotation or indexed, ensuring that the pivotable elements are biased adjacent the support frame 38 in the retracted position to prevent undesirable collapse of the canopy shell 44.

Once the user is seated in the user seat 38 of the mobility scooter 10, should they desire shelter, they are then able to move the canopy shell 44 into position. To do so, the moveable frame 40 can be drawn towards the front 26 of the vehicle 10, away from the support frame 38, and fanning out the interposed shell frame elements 48. This will extend the cover element 42 over the head of the user.

Typically, the moveable frame 40 will be brought into close proximity with, and perhaps resting on, the steering column 28 of the vehicle 10, to which the waterproof cover 66 may be attached, fixing the cover element 42 and therefore the canopy shell 44 into place.

To substantially seal the step-through 20, the shaped frame elements 52 can then be lowered, either manually or under gravity, thereby providing side walls 56 which can substantially prevent ingress of wind and rain into the mobility scooter 10. Similarly, the rear frame element 50 can be moved away from the support frame 38, and the cover element 42 sealed so as to provide the covered back portion 60.

Whilst the present embodiment seeks to substantially seal the step-through 20 using the shaped frame elements 52, it is foreseeable that the shaped-frame elements could also be adjacent to the step-through 20 such that wind protection is provided without requiring the shaped frame elements to be coincident with the chassis of the vehicle. Such shaped elements may still match or substantially match the contours of the step-through 20 in order to prevent wind ingress, but by being adjacent, set-apart, or slightly spaced outwardly or outboard from the chassis, the space inside the deployed canopy may be maximised.

By providing a canopy shell 44 thus retractable and extendable, the present invention is capable of protecting a user of the mobility scooter 10 from the elements whilst being readily moved out of the way when either conditions change, or the user needs to enter or exit the vehicle 10.

Figure 5:
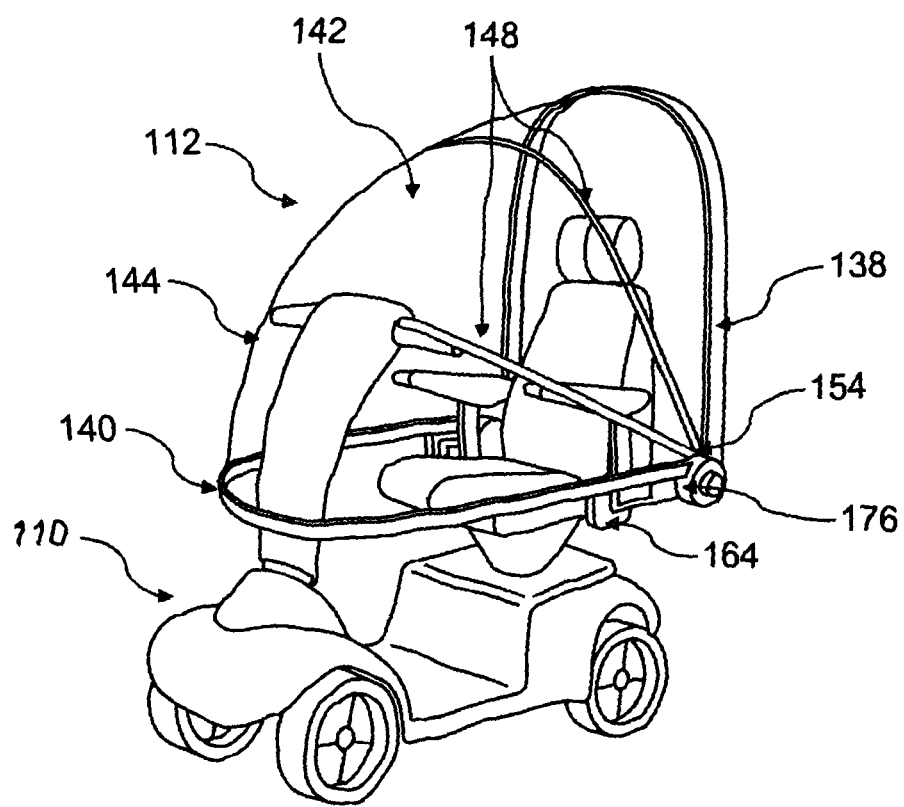
FIG. 5 shows a front perspective view of a personal mobility vehicle having a second embodiment of a retractable mobility-scooter canopy system, in accordance with the invention, the system being in a retracted condition.

A second embodiment of the invention is illustrated in FIG. 5. Similar or identical references refer to similar or identical parts to those described above, and therefore further detailed description is omitted for brevity.

The canopy apparatus 112 in this embodiment does not fully enclose the user, and the shape of the canopy shell 144 is provided solely by the moveable frame 140, the shell frame elements 148, the support element 138, and the cover element 142 therebetween; there is no rear frame element, nor are there shaped frame elements, although these elements could be provided as necessity dictates.

The major difference between this second embodiment and the embodiment previously described is that there is further provided a pair of engagement elements 176 which are fixed to either end of the support frame 138 at or near to the pivot points 154. Affixed to the moveable frame 140 are corresponding engagement means or mounting brackets 164 which are capable of engaging with the respective support frame 38. These might be a detented catch or similar hooked device, such as a sprung release button.

When the canopy shell 144 is in the extended condition, the front portion of the canopy shell 144 does not engage with the portable mobility vehicle 110. Instead, it hooks or extends over the steering column 128 of the vehicle 110 without engagement. However, in the extended condition, the engagement means 164 will be in the correct position so as to engage with the engagement elements 176, thereby locking the canopy shell 144 into position.

To return the canopy shell 144 to the retracted position, it is necessary to detach the engagement means 164 from the engagement elements 176 in order to be able to move the moveable frame 140. Once detached, the moveable frame 140 can then be moved or furled so as to be adjacent with the support frame 138, as in the above-described embodiment.

This second embodiment is advantageous due to the apparatus being demountably attachable to the mobility vehicle, and in particular the arm rests of the user's seat. As such, this embodiment is easily retrofittable to existing vehicles. A similar mounting means may also be utilised in the first embodiments, and/or a similar lowermost contoured shaped frame element 52 as in the first embodiment may be incorporated into the second embodiment in order to prevent or limit wind ingress and thus mitigate a tipping hazard.

It could be envisaged that the cover element of the canopy shell could be provided so as to be relatively rigid, thereby holding its shape in the extended condition without requiring any shell frame elements to provide the underlying structure. In such an arrangement, only a support frame and a moveable frame would need to be provided.

It will be appreciated that, although the shell frame elements are depicted as being substantially arcuate and extending substantially over the user seat of the mobility scooter, that this is not the only manner in which a retractable canopy shell could be constructed. For example, the moveable frame and support frame could be interconnected by telescopic frame elements, arranged in a perpendicular fashion with respect to the above-described shell frame elements.

Frame elements could run in parallel with the curvature of the chassis or body of the mobility scooter, for example, on rails along which slidable said frame elements could be moved to retract or extend the canopy shell. It is therefore apparent that the pivotable arrangements as previously described are not the only ways in which a canopy shell could be formed having wind-occlusion portions for protection.

As mentioned above, the steering-column protector of the first embodiment of the canopy apparatus is described as being a waterproof cover which affixes to the steering column, and which can be folded away with the cover element in the retracted state. However, it is equally possible that the waterproof cover or similar engagement means could remain attached to the steering column of the vehicle more permanently, with the cover element engaging with the waterproof cover in the extended state. This engagement could be effected by buttons or tabs, for example.

The above-described embodiments assume that a user will be manually retracting and extending the canopy apparatus; however, it is entirely possible, if not necessarily desirable from a cost perspective, to provide an automated retraction and extension mechanism, by providing one or more actuators in communication with the moveable frame. This may be particularly helpful for infirm users of the canopy apparatus, who may not have the upper-body strength or reach to manually operate the retraction or extension of the canopy shell. For example, motors can be provided at the pivot points, powerable by the motor or engine of the vehicle and operable by the user via a button, such as on the steering column or user-operable steering handlebar or wheel.

Whilst the moveable pivot points are described in relation to a canopy system having a canopy-system shaped to have a wind-occluding portion, it may also be possible to provide the moveable pivot points in relation to any other pivotable canopy system. The movable pivot points therefore adjusting the width of the canopy system for passing through narrow doors, gaps, or passageways.

It is therefore possible to provide a canopy apparatus for a personal mobility vehicle which includes a support frame and a moveable frame, the moveable frame being actuatable relative to the support frame, with a pliantly-flexible cover element being positioned therebetween. Such an apparatus can be moved between extended and retracted conditions, thereby enabling protection for a user of the personal mobility vehicle from inclement weather. In the extended position, a lowermost edge of the cover matches or substantially matches a front-to-back profile of the chassis from the front wheel arch to the rear wheel arch including the step-through therebetween, thus preventing or limiting wind ingress and this mitigating a possible tipping hazard. It is possible to provide an easily demountable and thus retrofitable apparatus, along with a steering column protector and storage container cover, either of which may be independent of the other and/or the shell cover.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention herein described and defined.

The invention claimed is:

1. A retractable mobility-scooter canopy system comprising a plurality of support elements, at least a majority of the support elements being movable relative to each other, and a pliantly-flexible cover element extending between each said movable support element, each said cover element being at least in part light transmissible, an in use lowermost support element having a contoured longitudinal extent defining a wind-occlusion portion which in use complementarily or substantially complementarily matches a step-through portion of the chassis of the mobility scooter thereby occluding wind ingress, wherein, the support elements and the pliantly-flexible cover elements form a substantially curved or aerodynamic profile, for added protection from tipping or rolling due to crosswinds;

the support elements move relative to each other by way of pivoting about a shared axis, wherein the shared axis is defined by two pivot points formed as part of a horizontal frame element; and adjustment of the horizontal frame element allows movement of the pivot points along the shared axis.

2. The retractable mobility-scooter canopy system as claimed in claim 1, wherein the in use wind-occlusion portion matches or substantially matches a chassis curvature of a mobility scooter to accommodate front and rear wheel arches and the step-through portion therebetween.

3. The retractable mobility scooter canopy system as claimed in claim 1, wherein the support elements move relative to each other by way of telescopic extension.

4. The retractable mobility-scooter canopy system as claimed in claim 1, additionally comprising one or more mounts which attach the retractable mobility-scooter canopy system to the chassis or body of the mobility scooter.

5. The retractable mobility-scooter canopy system as claimed in claim 4, wherein the mounts make use of one or more releasable fixtures, thereby making the canopy system removable.

6. The retractable mobility-scooter canopy system as claimed in claim 1, wherein one or more of the support elements forms a roll bar for the protection of the occupant in the event of tipping or rolling of the mobility-scooter.

7. The retractable mobility-scooter canopy system as claimed in claim 1, additionally comprising an engagement element which secures the retractable mobility-scooter canopy system in an open, closed, or partially extended, position.

8. The retractable mobility-scooter canopy system as claimed in claim 1, additionally comprising one or more connectors on one or more of the support elements via which a storage container is attachable.

9. The retractable mobility-scooter canopy system as claimed in claim 1, the support elements including at least a support frame, a moveable frame and a plurality of secondary frame elements, the moveable frame and secondary frame elements being the moveable support elements.

10. A retractable mobility-scooter canopy system as claimed in claim 1, wherein the support elements and cover element define a retractable canopy shell, the canopy shell having a non-planar lowermost edge defining a bottom perimeter edge of the canopy shell which blocks or occludes a step-through of a mobility-scooter chassis.

11. A retractable mobility-scooter canopy system comprising a plurality of support elements, at least a majority of the support elements being movable relative to each other, and a pliantly-flexible cover element extending between each said movable support element, each said cover element being at least in part light transmissible, an in use lowermost support element having a contoured longitudinal extent defining a wind-occlusion portion which in use complementarily or substantially complementarily matches a step-through portion of the chassis of the mobility scooter thereby occluding wind ingress, wherein, the support elements and the pliantly-flexible cover elements form a substantially curved or aerodynamic profile, for added protection from tipping or rolling due to crosswinds;

the support elements move relative to each other by way of pivoting about a shared axis, wherein the shared axis is defined by two pivot points; and the two pivot points are movable along said shared axis to alter a width of the canopy system.

* * * * *